Dec. 30, 1930. C. J. DUNZWEILER 1,786,742
STORAGE BATTERY
Filed March 3, 1924
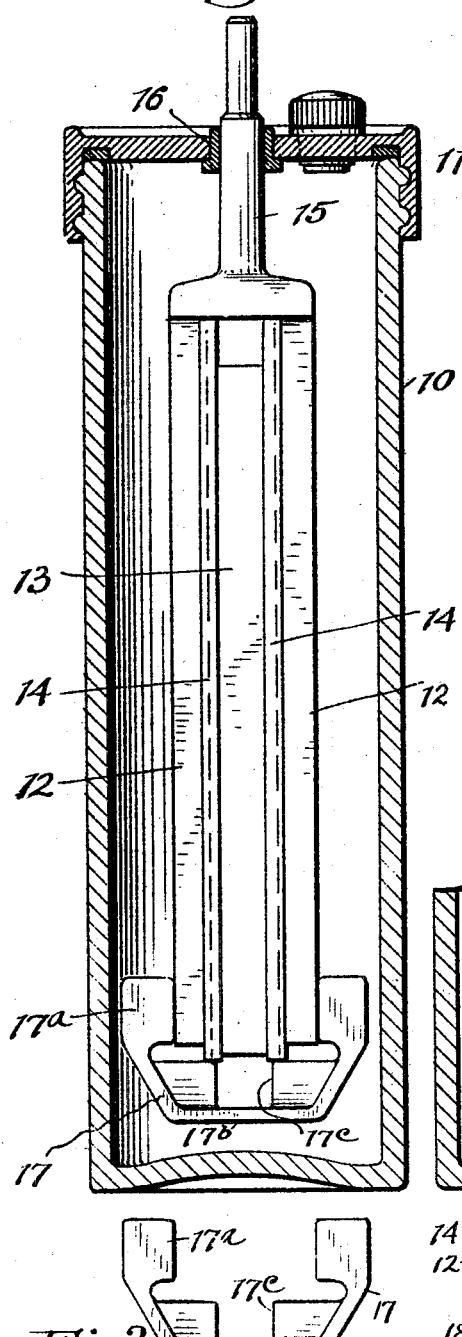
Fig. 1.
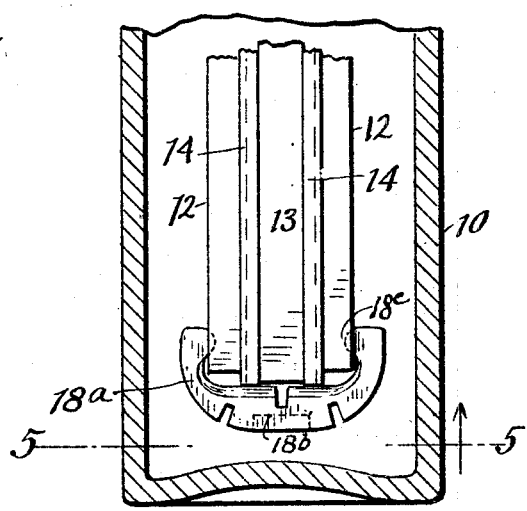
Fig. 4.
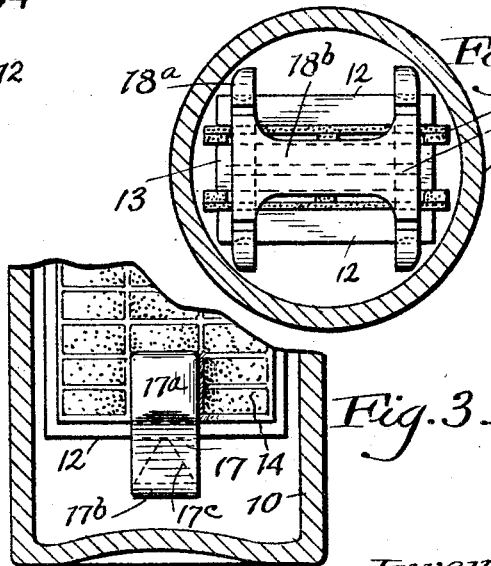
Fig. 5.
Fig. 3.
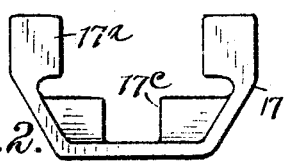
Fig. 2.
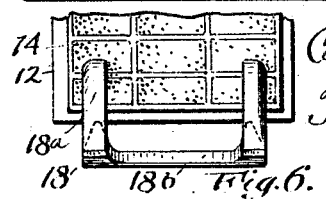
Fig. 6.
Inventor
Carl J. Dunzweiler
Thurston Bean Hudson
Attys Patented Dec. 30, 1930

1,786,742

UNITED STATES PATENT OFFICE

CARL J. DUNZWEILER, OF CLEVELAND, OHIO, ASSIGNOR TO WILLARD STORAGE BATTERY COMPANY, OF CLEVELAND, OHIO, A CORPORATION OF WEST VIRGINIA

STORAGE BATTERY

Application filed March 3, 1924. Serial No. 696,510.

This invention relates to certain improvements in storage batteries, and has particular reference to radio and other small batteries, using for each cell a container generally formed of glass and commonly in cylindrical form.

Bottom rests formed or resting on the bottom of the containers have heretofore been provided to support the battery element. In batteries employing rubber jars or other containers formed of rubber these bottom rests are generally in the form of ribs projecting from the bottom of the jars or compartments. In batteries employing cylindrical containers generally formed of glass, as above stated, the element is usually supported on an insulating ring or equivalent supporting device at the bottom of the container and projecting up therefrom.

It has been found in certain of these batteries, such as radio batteries having cylindrical containers with bottom rests as above stated, that short circuits are frequently caused by active material falling from the outer sides of the plates and lodging on or building up alongside these bottom rests or supports.

The object of the present invention is to eliminate the necessity for these bottom supports, and at the same time to prevent the plates spreading apart laterally. In accordance with the present invention an insulating clamping or holding device is utilized to prevent the spreading of the parts of the battery element, this device engaging the lower portions of the two outermost plates and extending beneath the battery element a suitable distance above the bottom of the container, this device including the lower cross portion being so formed as to prevent the lodging thereon of active material which might cause a short circuit.

The invention may be briefly summarized as consisting in certain novel details of construction and combinations and arrangements of parts which will be described in the specification and set forth in the appended claims.

In the accompanying sheet of drawings wherein I have shown two forms of the invention, Fig. 1 is a vertical sectional view through a cell of a battery, looking toward the edge of the battery element and showing the lower element clamping device in elevation; Fig. 2 is a detached view of the clamping device; Fig. 3 is a sectional view of the lower part of the battery with the section taken at right angles to the section in Fig. 1; Fig. 4 is a view similar to Fig. 1, showing the lower part of the battery only and a modified form of the element clamping device. Fig. 5 is a sectional view along the line 5—5 of Fig. 4, looking upwardly, and Fig. 6 is a view similar to Fig. 3, showing the modification of Figs. 4 and 5 but omitting the container.

Referring now to the drawings, 10 represents the container which in this instance is cylindrical and is preferably formed of glass. The container has a cover 11 which is preferably screwed in place. Inside the container is a battery element consisting of the positive and negative plates and separators between them. In this instance the element has two plates 12 of one polarity, and one plate 13 of the opposite polarity, the plates being spaced apart by separators or insulators 14.

The positive and negative plates have the usual terminal posts 15 which extend through the cover 11, and in this instance through tightly fitting bushings 16.

In accordance with the embodiments of the invention herein illustrated, the battery element is supported by the cover 11 through the terminal post 15. In other words, it is free of the bottom of the container. With the elements supported in this fashion the posts should fit tightly in the bushing 16 to prevent the weight of the element pulling the posts down through the cover, or if desired or found necessary the posts may be provided with nuts or other shoulders immediately above the cover and engaging the top of the same to hold the element to proper height.

With the element thus supported and with the bottom rest eliminated, I provide a suitable insulated clamping device to prevent the parts of the element from spreading or "fanning" at the bottom. In the modification shown in Fig. 1 the clamping device is shown at 17. It consists of a strap with end portions 17a engaging the outer plates 12 near their lower ends, and it has a cross portion 17b extending underneath the plates and separators. In this instance this cross portion has a pair of spaced upstanding V or wedge-shaped portions 17c on which the lower edges of the separators rest. This clamp 17 may be formed of any suitable material, such as hard rubber, and the resiliency of the material causes the ends 17a to engage the plates tightly enough to prevent the clamp slipping off.

In Figs. 4, 5, 6, I have shown a modification of the clamp, which in this instance consists virtually of a duplication of the U-shaped clamp shown in Figs. 1 to 3, since it has two U-shaped portions 18, 18a, which engage the two outermost plates near their lower ends, and which extend underneath the element, these portions being connected together by a bridging portion 18b.

With any of the forms of the invention the ends of the clamps which engage the plates may be secured to the latter in any desired manner. In the modification last illustrated the plates are provided with slight depressions to receive the ends of the clamping portions, as illustrated at 18c. Any other suitable way for holding the clamps in clamping engagement with the plates may be employed.

I do not desire to be confined to the details shown, but aim in my claims to cover all modifications which do not involve a departure from the spirit and scope of my invention.

Having described my invention, I claim:

1. A storage battery comprising a container, a battery element including a plurality of plates suspended above the bottom of the container, and a clamp independent of the supporting means, said clamp being resilient and having a gripping engagement with opposite side faces of the element and having a portion extending across the bottom of the element, said portion being so formed as to prevent accumulation of material thereon.

2. In a storage battery, a container having a battery element therein consisting of a plurality of plates, means for suspending the element within the container above the bottom thereof, and a resilient clamp for preventing the parts of the element from spreading, said clamp having opposed gripping portions engaging the outer faces of the outermost plates adjacent the lower ends thereof and having a portion extending beneath all of the plates of said element.

3. In a storage battery, a container having a battery element therein comprising a plurality of plates, means for suspending the element above the bottom of the container, and an insulating member independent of the support for said element for preventing the parts of the element spreading, said member engaging lower portions of the outer faces of the outermost plates, and extending beneath the lower edges of all of the plates of the element at a distance from the side edges of the plates and having line contact therewith.

4. A storage battery comprising a container, a battery element including a plurality of plates suspended above the bottom of the container, and a clamp engaging said element to prevent spreading of said plates, said clamp being retained in place solely by its engagement with the outer faces of said element.

In testimony whereof, I hereunto affix my signature.

CARL J. DUNZWEILER.